(12) United States Patent
Sahara et al.

(10) Patent No.: US 7,651,605 B2
(45) Date of Patent: Jan. 26, 2010

(54) PROCESS OF HYDROTREATING HEAVY HYDROCARBON OIL

(75) Inventors: Wataru Sahara, Yokohama (JP); Yoshiaki Fukui, Yokohama (JP)

(73) Assignee: Nippon Oil Corporation, Tokyo (JP)

( * ) Notice: Subject to any disclaimer, the term of this patent is extended or adjusted under 35 U.S.C. 154(b) by 144 days.

(21) Appl. No.: 11/679,414

(22) Filed: Feb. 27, 2007

(65) Prior Publication Data

US 2007/0138063 A1    Jun. 21, 2007

Related U.S. Application Data

(63) Continuation of application No. PCT/JP2005/015829, filed on Aug. 24, 2005.

(30) Foreign Application Priority Data

Aug. 27, 2004    (JP) ............................... 2004-248123

(51) Int. Cl.
    *C10G 45/00*    (2006.01)
(52) U.S. Cl. ........................ 208/208 R; 208/92; 208/93; 208/94; 201/26
(58) Field of Classification Search ............. 208/208 R, 208/209, 106–108, 112, 92–94; 201/26
    See application file for complete search history.

(56) References Cited

U.S. PATENT DOCUMENTS

| | | | |
|---|---|---|---|
| 4,743,359 A * | 5/1988 | Ting et al. .................... | 208/134 |
| 5,395,511 A * | 3/1995 | Kubo et al. ............... | 208/111.3 |
| 6,334,947 B1 * | 1/2002 | De Boer et al. ........ | 208/111.25 |
| 2004/0121472 A1 * | 6/2004 | Nemana et al. ............... | 436/55 |
| 2007/0187294 A1 * | 8/2007 | Ancheyta Juarez et al. ... | 208/58 |

FOREIGN PATENT DOCUMENTS

| | | | |
|---|---|---|---|
| CA | 2 150 205 | A1 | 11/1995 |
| CA | 2150205 | * | 11/1995 |
| EP | 0 512 778 | A1 | 11/1992 |
| EP | 0 902 078 | A2 | 3/1999 |
| JP | 04-356590 | A | 12/1992 |
| JP | 5-156263 | A | 6/1993 |
| JP | 7-316566 | A | 12/1995 |
| JP | 11-80754 | A | 3/1999 |
| JP | 2004-115581 | A | 4/2004 |

OTHER PUBLICATIONS

Choudhary, T. V. et al. (2008). Fuel Processing Technology, 89, 697-703.*

* cited by examiner

*Primary Examiner*—Robert J Hill, Jr.
*Assistant Examiner*—Brian McCaig
(74) *Attorney, Agent, or Firm*—Panitch Schwarze Belisario & Nadel LLP

(57) ABSTRACT

When a heavy fuel oil with a sulfur content of 1 percent by mass or lower is produced from a feedstock consisting of a heavy hydrocarbon oil derived from a heavy crude oil having an API degree of 30 or less and containing sulfur and metal components in amounts larger than those of ordinary crude oil, the conventional processes requires higher reaction temperature and was accompanied with a remarkably enhanced deactivation rate of the catalyst which results in a remarkable shortened lifetime thereof. Therefore, it is regarded as substantially impossible to treat the feedstock. However, the present invention makes it possible to produce a low sulfur heavy fuel oil with a sulfur content of 1 percent by mass or less by hydrotreating a mix oil of 100 parts by volume of a heavy hydrocarbon oil derived from a heavy crude oil with an API degree of 30 or less and 30 to 1000 parts by volume of a heavy hydrocarbon oil derived from a light crude oil with an API degree of 35 or greater, without lowering the degree of demetallization while retarding the deactivation rate of the catalyst.

4 Claims, No Drawings

PROCESS OF HYDROTREATING HEAVY HYDROCARBON OIL

CROSS-REFERENCE TO RELATED APPLICATIONS

This application is a Continuation of International Application No. PCT/JP2005/015829, filed Aug. 24, 2005, which was published in the Japanese language on Mar. 2, 2006, under International Publication No. WO 2006/022419 A1 and the disclosure of which is incorporated herein by reference.

BACKGROUND OF THE INVENTION

The present invention relates to processes of hydrotreating heavy hydrocarbon oil. More specifically, the present invention relates to a process of hydrotreating capable of producing a low sulfur heavy fuel oil with a sulfur content of 1 percent by mass or less at a lower cost, from a feedstock consisting of a heavy hydrocarbon oil derived from a heavy crude oil with an API degree of 30 or below, without lowering the degree of demetallization.

A process of producing a low sulfur heavy fuel oil is known, in which to pass a feedstock consisting of a heavy hydrocarbon oil containing more sulfur and metal components, through a fixed bed reactor filled with two types of catalysts, i.e., a demetallization catalyst and a desulfurization catalyst so as to reduce the sulfur content of the feedstock.

When a heavy hydrocarbon oil (feedstock) is brought into contact with a hydrotreating catalyst, a desulfurization reaction occurs thereby removing sulfur components in the feedstock, i.e., removing sulfur components from organic sulfur compounds such as benzothiophenes, dibenzothiophenes, mercaptans, thioethers, and dithioethers. In addition to the desulfurization reaction, there occur a demetallization reaction removing metal components such as nickel, vanadium, iron, and sodium, a cracking reaction, a denitrification reaction at the same time. However, as these reactions proceed, they involve the secondary formations of cokes and metals which deposit in the pores or on the surface, of the hydrotreating catalyst. These deposits poison the active sites on the hydrotreating catalyst and cause a reduction in the catalyst activities such as desulfurization activity. Furthermore, the deposits are built up in and plug the pores of the catalyst and cause a reduction in the catalytic activities. In general, the lower the API degree of a feedstock, the greater the sulfur compounds and metal such as nickel and vanadium contained in the heavy hydrocarbon oil derived from the feedstock, resulting in an enhanced deactivation rate of the catalyst. Therefore, when a heavy hydrocarbon derived from a feedstock with a low API degree is treated, it is necessary to drastically reduce the throughput. The molecules containing metals in the heavy hydrocarbon oil are large in size and poor in reactivity and thus lower the degree of demetallization and adversely affect the subsequent devices.

Low sulfur heavy fuel oils are used for electric power, boilers, ships, and industrial furnaces. When an attempt is made to collect a low sulfur heavy fuel oil from a feedstock consisting of a heavy hydrocarbon oil derived from a heavy crude oil containing sulfur and metal components in amounts larger than those of ordinary crude oil and having an API degree of 30 or below by the conventional processes, it requires higher reaction temperature and is accompanied with a remarkably enhanced deactivation rate of the catalyst, resulting in a remarkably shortened life time thereof. Therefore, it was regarded substantially impossible to produce a low sulfur heavy fuel with a sulfur content of 1 percent by mass or less, by the conventional processes. As the result, there arose a problem that heavy crude oils with a low API degree can not be utilized effectively.

BRIEF SUMMARY OF THE INVENTION

As the results of extensive research and study, the present invention was accomplished on the basis of the finding a process of producing a low sulfur heavy fuel oil with a sulfur content of 1 percent by mass or less efficiently, which process makes it possible to treat a heavy hydrocarbon oil derived from a heavy crude oil with an API degree of 30 or lower, which has been regarded as impossible to be treaded, by hydrotreating a mix oil of a heavy hydrocarbon oil derived from a heavy crude oil with an API degree of 30 or lower and a heavy hydrocarbon oil derived from a light crude oil with an API degree of 35 or greater, in specific amounts, without lowering the degree of demetallization while retarding the deactivation rate of the catalyst.

That is, the present invention relates to a process of hydrotreating a heavy hydrocarbon oil, comprising hydrotreating a mix oil of 100 parts by volume of a heavy hydrocarbon oil derived from a heavy crude oil with an API degree of 30 or less and 30 to 1000 parts by volume of a heavy hydrocarbon oil derived from a light crude oil with an API degree of 35 or greater so as to produce a low sulfur heavy fuel oil with a sulfur content of 1 percent by mass or less.

The present invention also relates to the aforesaid process wherein the mix oil is hydrotreated under conditions of a hydrogen partial pressure of 7 to 25 MPa, an LHSV of 0.01 to 10 $h^{-1}$, a reaction temperature of 250 to 450° C., and a hydrogen/oil ratio of 500 to 8000 SCF/BBL.

Further, the present invention also relates to the aforesaid process wherein a catalyst with a surface area of $1.0 \times 10^7$ to $1.0 \times 10^9$ $m^2/m^3$ and a pore volume of 0.20 to 0.60 $m^3/m^3$ is used, the catalyst being formed by building up one or more catalysts each comprising 0.03 to 10 percent by mol of at least one metal selected from the Group VIII metals of the periodic table and 0.1 to 10 percent by mole of at least one metal selected from the Group VIB metals or the periodic table, supported on a catalyst support mainly composed of alumina.

DETAILED DESCRIPTION OF THE INVENTION

The present invention will be described in more detail below.

The heavy crude oil with an API degree of 30 or less used herein denotes a crude oil whose API degree calculated by the following formula is 30 or less:

$$API \text{ degree} = 141.5/(\text{specific gravity } 60/60° \text{ F.}) - 131.5.$$

The specific gravity in the above formula denotes a specific gravity measured in accordance with JIS K 2249 "Crude petroleum and petroleum products-Determination of density and petroleum measurement tables based on a reference temperature (15° C.).

The heavy crude oil used in the present invention has an API degree of 30 or less, preferably 29 or less, and more preferably 28 or less. A heavy crude oil with an API degree of greater than 30 can be treated without using the process of the present invention because the heavy hydrocarbon derived from the crude oil is sufficiently high in reactivity.

Specific examples of the heavy crude oil with an API degree of 30 or less, used in the present invention include Khafji crude oil, Arabian heavy crude oil, and Al Rayyan crude oil.

The heavy hydrocarbon oil derived from the heavy crude oil with an API degree of 30 or less denotes a residue containing 70 percent by mass or more, preferably 80 percent by mass or more, more preferably 90 percent by mass or more, and more preferably 95 percent by mass or more of a fraction with a distillation temperature of 300° C. or higher, produced upon atmospheric or vacuum distillation of a heavy crude oil with an API degree of 30 or less.

There is no particular restriction on the characteristics of the heavy hydrocarbon oil derived from the heavy crude oil with an API degree of 30 or less. Typical characteristics are as follows:

Specific gravity (15/4° C.): 0.9700 to 1.100
Sulfur content: 4.0 to 8.0 percent by mass
Metal content (Ni+V): 70 to 200 ppm by mass
Residual carbon content: 10 to 20 percent by mass.

The distillation temperature used herein denotes a temperature measured in accordance with "6. Vacuum distillation test method" described in JIS K 2254 "Petroleum products-Determination of distillation characteristics".

The light crude oil with an API degree of 35 or greater used herein denotes a crude oil whose API degree calculated by the above-described formula is 35 or greater.

The light crude oil used in the present invention has an API degree of 35 or greater, preferably 35.5 or greater, and more preferably 36 or greater. A light crude oil with an API degree of less than 35 is not preferable because the effect of retarding the deactivation of the catalyst can not be attained due to the reduced reactivity of the heavy hydrocarbon oil derived from the light crude oil.

Specific examples of the light crude oil with an API degree of 35 or greater, used in the present invention include Arabian extra light crude oil, Lower-Zakum crude oil, and Murban crude oil.

The heavy hydrocarbon oil derived from the light crude oil with an API degree of 35 or greater denotes a residue containing 70 percent by mass or more, preferably 80 percent by mass or more, more preferably 90 percent by mass or more, and more preferably 95 percent by mass or more of a fraction with a distillation temperature of 300° C. or higher, produced upon atmospheric or vacuum distillation of a light crude oil with an API degree of 35 or greater.

There is no particular restriction on the characteristics of the heavy hydrocarbon oil derived from the light crude oil with an API degree of 35 or greater. Typical characteristics are as follows:

Specific gravity (15/4° C.): 0.9100 to 0.9500
Sulfur content: 1.1 to 3.0 percent by mass
Metal content (Ni+V): 3 to 30 ppm by mass
Residual carbon content: 2 to 8 percent by mass.

In the present invention, 100 parts by volume of the heavy hydrocarbon oil derived from the heavy crude oil with an API degree of 30 or less is mixed with 30 to 1000 parts by volume, preferably 40 to 900 parts by volume, and more preferably 100 to 700 parts by volume of the heavy hydrocarbon oil derived from the light crude oil with an API degree of 35 or greater. If more than 1000 parts by volume of the heavy hydrocarbon oil derived from the light crude oil with an API degree of 35 or greater is mixed with 100 parts by volume of the heavy hydrocarbon oil derived from the heavy crude oil with an API degree of 30 or less, the effects of the present invention can not be attained because the ratio of the heavy hydrocarbon derived from the heavy crude oil will be reduced. If the amount of the heavy hydrocarbon oil derived from the light crude oil with an API degree of 35 or greater is less than 30 parts by volume or less, the effect of retarding the deactivation rate of the catalyst can not be attained.

As long as the effects of the present invention are not adversely affected, the mix oil may be blended with a heavy hydrocarbon oil derived from a medium crude oil with an API degree of greater than 30 and less than 35. There is no particular restriction on the content ratio of the heavy hydrocarbon oil. However, in order that the effects of the present invention are sufficiently exerted, the heavy hydrocarbon oil is desirously contained in an amount of 30 parts by volume of 100 parts by volume of the whole mixture.

There is no particular restriction on the characteristics of the medium crude oil. Typical characteristics are as follows:

Specific gravity (15/4° C.): 0.9500 to 0.9700
Sulfur content: 3.0 to 4.0 percent by mass
Metal content (Ni+V): 30 to 70 ppm by mass
Residual carbon content: 8 to 10 percent by mass.

Next, the mix oil is hydrotreated.

There is no particular restriction on the conditions for the hydrotreating of the present invention. The hydrogen partial pressure is preferably from 7 to 25 MPa, more preferably from 9 to 22 MPa, and more preferably from 10 to 21 MPa. If the hydrogen partial pressure at the inlet is less than 7 MPa, the life time of the catalyst would be shortened due to the excessive formation of cokes thereon. If the hydrogen partial pressure is greater than 25 MPa, the process would be unpractical in economical view due to the necessity to drastically increase the construction cost of reaction towers and peripheral devices.

The LHSV is preferably from 0.01 to 10 $h^{-1}$, more preferably from 0.02 to 8 $h^{-1}$, and more preferably from 0.04 to 6 $h^{-1}$. If the LHSV is less than 0.01 $h^{-1}$, the process would be unpractical in economical view due to the necessity of drastically increasing the construction cost of reaction towers. If the LHSV is greater than 10 $h^{-1}$, a sufficient catalytic activity may not be exerted.

There is no particular restriction on the reaction mode which, therefore, may be selected from various processes such as fixed bed and moving bed reaction modes. A fixed bed reaction mode is preferably used.

There is no particular restriction on the catalyst used in the present invention. It is preferable to used a catalyst with a surface are of $1.0 \times 10^7$ to $1.0 \times 10^9$ $m^2/m^3$ and a pore volume of 0.20 to 0.60 $m^3/m^3$, formed by building up one more catalysts each comprising 0.03 to 10 percent by mol of at least one metal selected from the Group VIII metals of the periodic table and 0.1 to 10 percent by mole of at least one metal selected from the Group VIB metals or the periodic table, supported on a catalyst support composed of mainly alumina.

Examples of the support include alumina, alumina-silica, alumina-boria, alumina-titania, alumina-zirconia, alumina-magnesia, alumina-silica-zirconia, alumina-silica-titania, various zeolites, and supports produced by adding a porous inorganic compound such as various clay minerals, for example, zeolite and montmorillonite to alumina.

Examples of the Group VIB metals of the periodic table include chromium, molybdenum, and tungsten. Examples of the Group VIII metals of the periodic tables include iron, cobalt, and nickel.

These metal are usually used in combination. Specific examples of the combination include nickel-molybdenum, cobalt-molybdenum, nickel-tungsten, nickel-cobalt-molybdenum, and tungsten-cobalt-nickel. These metals are supported in metal oxide or metal sulfide form.

In the present invention, the catalyst may be produced by any of the known methods. Examples of the methods include immersion, impregnation, and coprecipitation methods.

The sulfur content of the heavy fuel oil produced by the process of the present invention is 1 percent by mass or less, preferably 0.8 percent by mass or less, and more preferably 0.6 percent by mass or less.

When the sulfur content of the produced heavy fuel oil is in excess of 1 percent by mass, the deactivation rate of the catalyst is low even though a heavy hydrocarbon oil derived from a heavy crude oil with a less API degree is treated. It is thus not necessary to mix the heavy hydrocarbon oil with a heavy hydrocarbon oil derived from a light crude oil with a large API degree, resulting in no necessity to use the present invention.

There is no particular restriction on the lower limit sulfur content of the low sulfur heavy fuel oil produced by the present invention. However, in order to make use of the advantageous effects of the present invention, the lower limit is preferably 0.05 percent by mass or more and more preferably 0.1 percent by mass or more. If desulfurization is carried out until the sulfur content reaches less than 0.05 percent by mass, the deactivation rate of the catalyst is rapidly increased regardless of the characteristics of the feedstock.

The sulfur component (sulfur content) used herein denotes a sulfur content measured in accordance with "6. Radiation Excitation Method" described in JIS K 2541 "Crude oil and petroleum products-Determination of sulfur content".

APPLICABILITY IN THE INDUSTRY

The present invention makes it possible to collect a low sulfur heavy fuel oil with a sulfur content of 1 percent by mass or less, from a heavy crude oil with an API degree of 30 or less, which has been regarded as impossible to be treated, without lowering the demetallization rate. As a result, the throughput of cheap heavy crude oils can be increased, thereby increasing the economical efficiency of a refinery.

BEST MODE FOR CARRYING OUT THE INVENTION

The present invention will be described in more details with reference to the following examples but is not limited thereto.

EXAMPLE 1

A mixture of 100 parts by volume of heavy feedstock 1 (heavy hydrocarbon oil derived from a heavy crude oil with an API degree of 30 or less) and 400 parts by volume of light feedstock 1 (heavy hydrocarbon oil derived from a light crude oil with an API degree of 35 or greater) as set forth in Table 1 was hydrotreated using a catalyst system as set forth in Table 2 under conditions of a hydrogen partial pressure of 17 MPa, a hydrogen/oil ratio of 5000 SCF/BBL, an LHSV of 0.24 h$^{-1}$, and the sulfur content of the resulting oil of 0.3 percent by mass. The results are set forth in Table 3.

EXAMPLE 2

Hydrotreating was conducted using the same catalyst and reaction conditions as those used in Example 1 except using a feedstock produced by mixing heavy feedstock 1 and light feedstock 1 at a ratio of 100 parts by volume:233 parts by volume. The results are set forth in Table 3.

EXAMPLE 3

Hydrotreating was conducted using the same catalyst and reaction conditions as those used in Example 1 except using a feedstock produced by mixing heavy feedstock 1 and light feedstock 1 at a ratio of 100 parts by volume:100 parts by volume. The results are set forth in Table 3.

EXAMPLE 4

Hydrotreating was conducted using the same catalyst and reaction conditions as those used in Example 1 except using a feedstock produced by mixing 100 parts by volume of heavy feedstock 2 (heavy hydrocarbon oil derived from a heavy crude oil with an API degree of 30 or less) and 100 parts by volume of light feedstock 2 (a heavy hydrocarbon oil derived from a light crude oil with an API degree of 35 or greater). The results are set forth in Table 3.

COMPARATIVE EXAMPLE 1

Hydrotreating was conducted using the same catalyst and reaction conditions as those used in Example 1 except using heavy feedstock 1 set froth in Table 1 as a feedstock. The results are set forth in Table 3.

COMPARATIVE EXAMPLE 2

Hydrotreating was conducted using the same catalyst and reaction conditions as those used in Example 1 except using heavy feedstock 1 set forth in Table 1 as a feedstock and the LHSV was changed to 0.12 h$^{-1}$. The results are set forth in Table 3.

COMPARATIVE EXAMPLE 3

Hydrotreating was conducted using the same catalyst and reaction conditions as those used in Example 1 except using heavy feedstock 2 set forth in Table 1 as a feedstock and the LHSV was changed to 0.12 h$^{-1}$. The results are set forth in Table 3.

TABLE 1

| Feedstock | | Heavy Feedstock 1 | Heavy Feedstock 2 | Light Feedstock 1 | Light Feedstock 2 |
|---|---|---|---|---|---|
| API Degree of Feedstock | | 24.9 | 27.7 | 39.6 | 39 |
| 300° C. + Fraction | vol % | 99.9 | 99.9 | 99.9 | 99.9 |
| Specific Gravity | (15/4° C.) | 1.007 | 0.9854 | 0.9209 | 0.9388 |
| Sulfur Content | mass % | 5.4 | 4.4 | 2.4 | 2.6 |
| Ni + V Content | mass ppm | 131 | 116 | 25 | 9 |
| Residual Carbon Content | mass % | 15 | 13.8 | 3.8 | 2.6 |

TABLE 2

| Catalyst Layer | Catalyst | Surface Area m²/m³ | Pore Volume m³/m³ | Support | Supported Metal Mo mol % | Supported Metal Ni mol % | Catalyst Ratio in Catalyst Layer vol % |
|---|---|---|---|---|---|---|---|
| First Catalyst Layer | A | $7.9 \times 10^7$ | 0.34 | Alumina | 6.1 | 3.2 | 33.3 |
| Second Catalyst Layer | B | $1.1 \times 10^8$ | 0.39 | Alumina | 8.3 | 4.5 | 33.4 |
| Third Catalyst Layer | C | $1.4 \times 10^8$ | 0.37 | Alumina | 8.3 | 4.5 | 33.3 |

TABLE 3

| | | Examples 1 | 2 | 3 | 4 | Comparative Examples 1 | 2 | 3 |
|---|---|---|---|---|---|---|---|---|
| Mix Ratio vol % | | | | | | | | |
| Heavy Feedstock 1 | | 100 | 100 | 100 | 0 | 100 | 100 | 0 |
| Heavy Feedstock 2 | | 0 | 0 | 0 | 100 | 0 | 0 | 100 |
| Light Feedstock 1 | | 400 | 233 | 100 | 0 | 0 | 0 | 0 |
| Light Feedstock 2 | | 0 | 0 | 0 | 100 | 0 | 0 | 0 |
| Hydrogen Partial Pressure | MPa | 17 | 17 | 17 | 17 | 17 | 17 | 17 |
| LHSV | h⁻¹ | 0.24 | 0.24 | 0.24 | 0.24 | 0.24 | 0.12 | 0.12 |
| Hydrogen/Oil Ratio | SCF/BBL | 5000 | 5000 | 5000 | 5000 | 5000 | 5000 | 5000 |
| Sulfer Content of Produced Oil | mass % | 0.3 | 0.3 | 0.3 | 0.3 | 0.3 | 0.3 | 0.3 |
| Reaction Temperature upon Initiation of Hydrotreating | °C. | 363 | 368 | 372 | 370 | 390 | 375 | 373 |
| Catalyst Deactivation rate | °C./day | 0.11 | 0.16 | 0.19 | 0.18 | 0.9 | 0.42 | 0.38 |
| Average Demetalization rate | mass % | 83 | 87 | 85 | 84 | 70 | 75 | 74 |

As apparent from the results set forth in Table 3, the deactivation rate of the catalyst was able to be drastically retarded by the process of the present invention, i.e., by hydrotreating a feedstock produced by mixing a heavy hydrocarbon oil derived from a heavy crude oil with an API degree of 30 or less with a heavy hydrocarbon oil derived from a light crude oil with an API degree of 35 or greater in predetermined amounts. In order to make a one year operation possible, the deactivation rate of the catalyst is required to be 0.20° C./day or shorter. With regard to the average demetallization rate, the process of the present invention can maintain 80% or greater that is generally required.

On the contrary, in Comparative Example 1 using the heavy hydrocarbon oil derived from the heavy crude oil with an API degree of 24.9, the deactivation rate was 0.9° C./day which is extremely high, and the demetallization rate was decreased to 70%.

In Comparative Example 2 wherein the throughput of the heavy hydrocarbon derived from the heavy crude oil with an API degree of 24.9 was halved, the deactivation rate was 0.42° C./day which is high, and the demetallization rate was decreased to 75%.

In Comparative Example 3 wherein the heavy hydrocarbon oil derived from the heavy crude oil with an API degree of 27.7, the deactivation rate was 0.38° C./day which is high, and the demetallization rate was decreased to 74%.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A process of hydrotreating a heavy hydrocarbon oil, comprising the steps of:
    distilling a heavy crude oil with an API degree of 30 or less to obtain a light fraction distillate of the heavy crude oil and a heavy hydrocarbon oil distilled residue of the heavy crude oil;
    distilling a light crude oil with an API degree of 35 or greater to obtain a light fraction distillate of the light crude oil and a heavy hydrocarbon oil distilled residue of the light crude oil;
    mixing 100 parts by volume of the heavy hydrocarbon oil distilled residue of the heavy crude oil and 30 to 1000 parts by volume of the heavy hydrocarbon oil distilled residue of the light crude oil to obtain a mixed oil; and
    hydrotreating the mixed oil to produce a low sulfur heavy fuel oil with a sulfur content of 1 percent by mass or less.

2. The process according to claim 1, wherein a catalyst with a surface area of $1.0 \times 10^7$ to $1.0 \times 10^9$ m²/m³ and a pore volume of 0.20 to 0.60 m²/m³ is used, the catalyst being formed by building up one or more catalysts each comprising 0.03 to 10 percent by mol of at least one metal selected from the Group VIII metals of the periodic table and 0.1 to 10 percent by mole of at least one metal selected from the Group VIB metals of the periodic table, supported on a catalyst support mainly composed of alumina.

3. The process according to claim 1, wherein the hydrotreating of the mixed oil is performed under conditions of a hydrogen partial pressure of 7 to 25 MPa, an LHSV of 0.01 to 10 h$^{-1}$, a reaction temperature of 250 to 450° C., and a hydrogen/oil ratio of 500 to 8000 SCF/BBL.

4. The process according to claim 3, wherein a catalyst with a surface area of $1.0 \times 10^7$ to $1.0 \times 10^9$ m$^2$/m$^3$ and a pore volume of 0.20 to 0.60 m$^2$/m$^3$ is used, the catalyst being formed by building up one or more catalysts each comprising 0.03 to 10 percent by mol of at least one metal selected from the Group VIII metals of the periodic table and 0.1 to 10 percent by mole of at least one metal selected from the Group VIB metals of the periodic table, supported on a catalyst support mainly composed of alumina.

* * * * *